Nov. 20, 1923.  1,474,669
C. H. HAPGOOD
MILK RELEASER
Filed Nov. 25, 1921  2 Sheets-Sheet 2
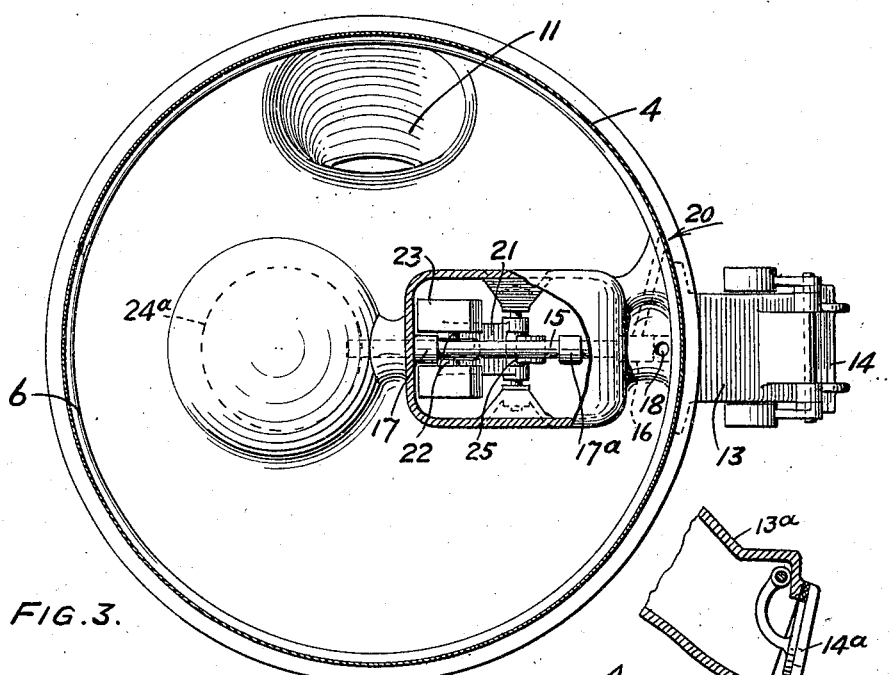
FIG. 3.
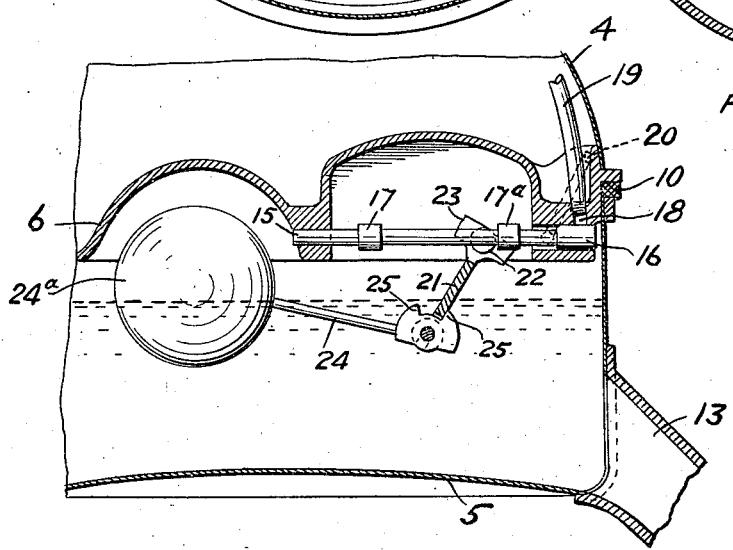
FIG. 4.
FIG. 5.
WITNESS:
INVENTOR
Cyrus Howard Hapgood
BY
ATTORNEY.

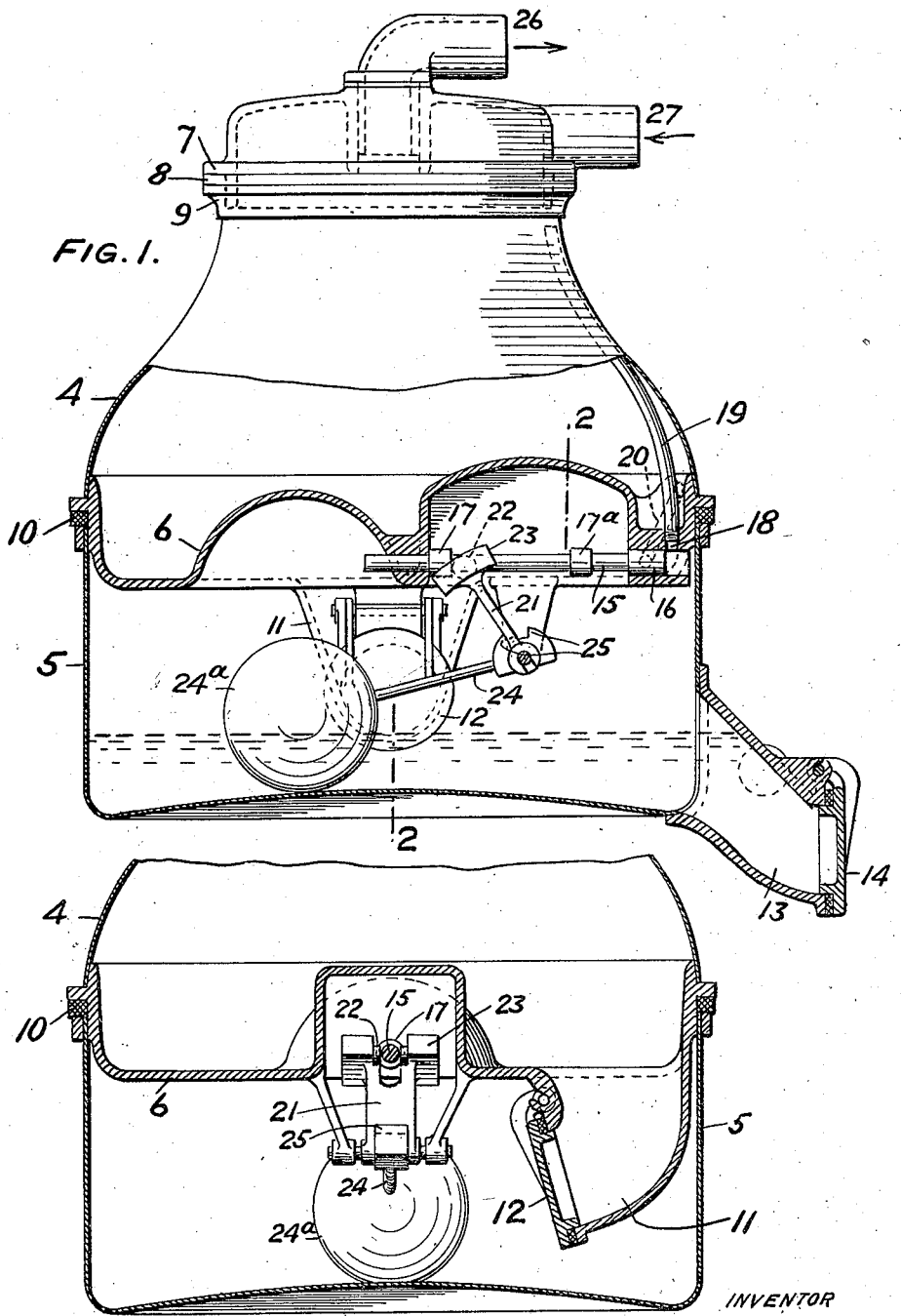

Patented Nov. 20, 1923.

1,474,669

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

MILK RELEASER.

Application filed November 25, 1921. Serial No. 517,469.

*To all whom it may concern:*

Be it known that I, CYRUS HOWARD HAPGOOD, a citizen of the United States, residing at Nutley, county of Essex, and State of New Jersey, have invented a new and useful Improvement in Milk Releasers, of which the following is a full, clear, and exact description, reference being had to the accompanying drawings, which form a part of this specification.

This invention relates to an improvement in milk releasers for milking systems such as are interposed between the milking machine and the milk pail, and which are arranged to deliver the milk drawn by the milking machine to a pail which is under atmospheric pressure.

It is known in the art to provide releasers for delivering the milk to a pail without an air-tight cover. In some of such releasers the milk delivery pipe communicating with the milking machine is open to atmosphere when milk is released therefrom as the inlet to the releasing chamber is valveless, only the outlet being provided with a valve.

In another form there is a can provided with two superposed compartments with a dividing partition between them and a counterbalanced valve controlling a port between the two compartments, as well as a valve controlled outlet pipe leading from the lower compartment. In this form there is a slide valve which alternately connects the lower compartment with the upper compartment and with atmosphere. The upper compartment constitutes what might be termed a primary releasing chamber, while the lower compartment comprises what might be termed a secondary releasing chamber. The control for this device comprises a float in the upper or primary compartment which actuates the slide valve, and is so arranged that when a predetermined amount of milk has been delivered to the primary compartment, the slide valve will be shifted by the float to connect the upper portions of the two compartments to each other and thereby permit the milk to flow from the primary compartment to the secondary compartment, and when the level of the milk in the primary compartments falls to a predetermined point the slide valve will again be shifted and closed communication between the two compartments through the port controlled by the slide valve and at the same time open the secondary compartment to atmosphere. This opening of the secondary compartment to atmosphere will permit the milk to flow therefrom through the valved outlet.

The object of my invention is to provide a releaser for a milking system which is adapted to be automatically drained into a pail or other receptacle under atmospheric pressure at predetermined intervals, and which is so arranged that the releasing chamber, while being drained, is closed to the suction chamber which is connected to and forms part of the suction line of the milking system, and is automatically opened to the system and closed to atmosphere after it has been drained to permit the milk to flow into said releasing chamber from the system without opening the system to atmosphere, by mechanism controlled by a float in the releasing chamber. This permits the control of the release of the milk from the system by the rise and fall of the milk in the releasing chamber or the chamber communicating with the atmosphere and not by the rise and fall of the milk in a chamber directly in communication with the system.

This is accomplished by placing a suction-controlled valve at the inlet to the releasing chamber, which is maintained closed by the suction of the system when the releasing chamber is being drained through a valved outlet, the valve of which outlet is closed, after draining, by the suction of the system and atmospheric pressure. The opening and closing of the inlet and outlet valves are controlled by varying the pressure in the releasing chamber by alternately connecting said releasing chamber with the suction of the system and atmosphere by means of a third valve which is actuated by the level of the milk in the said releasing chamber to reverse the pressure connections.

In the drawings, which illustrate a preferred embodiment of the invention:

Fig. 1 is a side elevation, partially in section, of one form of device built in accordance with my invention.

Fig. 2 is a sectional view on the line 2—2 of Fig. 1.

Fig. 3 is a sectional plan.

Fig. 4 is a detail sectional view of a portion of the device, similar to Fig. 1, with the control valve shifted.

Fig. 5 is a detail sectional view of a modified form of valve.

4 designates the upper shell and 5 the lower shell. 6 is a casting which forms the bottom of the upper shell and the cover for the lower shell, the bottom of the lower shell being formed integrally with the sides or body thereof. The cover 7 for the upper shell rests on a gasket 8 interposed between an annular flange on the cover and a similar flange 9 secured to the upper shell. A gasket 10 is interposed between flanges on the casting 6 and on the lower shell 5.

Extending from what I have heretofore termed the suction chamber formed by the upper shell 4 to the releasing chamber formed by the lower shell 5, is an inlet spout 11, the outlet end of which is controlled by a flap valve 12, through which the milk passes from the suction chamber to the releasing chamber. 13 is a second spout leading from the releasing chamber through which the milk is periodically drained into a suitable receiving pail or receptacle, the outer end of which spout is also controlled by a valve 14, which is counterweighted to open the valve when not acted on by suction.

Slidably mounted in the casting 6 is a valve stem 15 having a valve 16 and tappets 17 and 17ª thereon. The valve 16 is arranged to be reciprocated in a cylinder both ends of which are in communication with the releasing chamber. This valve is arranged to open communication between the releasing chamber and the suction chamber by means of port 18 communicating with a pipe or tube 19 which extends to the upper portion of the suction chamber when the valve is in the position in Fig. 1 and to open the releasing chamber to atmosphere through port 20 when the valve is in the position shown in Fig. 4.

Rockably mounted on a shaft in bearings extending from the casting 6 is a lever 21 having a fork at each end, one of which straddles the valve stem 15 and is provided with projections 22 and weights 23. The projections 22 are arranged to engage the tappets 17 and 17ª to shift the valve 16 as hereinafter described. 24 is a second lever on said shaft which is provided with a float 24ª at its outer end and projections 25 near its axis, which are arranged to engage the other fork of lever 21 to shift lever 21 in one direction as the milk rises in the releasing chamber and to shift said lever 21 in the reverse direction as the level of the milk falls in the releasing chamber.

Leading from the cover 7 is a nozzle 26 which is arranged to be connected to the vacuum pipe or line of the system, and 27 is a similar nozzle which is arranged to be connected to the teat cup for conducting the milk to the releaser.

In the normal operation of the system, the nozzle 26 is connected to the vacuum line of the system and the nozzle 27 is connected to a tube communicating with the teat cups. The suction through nozzle 26 will quickly form a partial vacuum in the suction chamber, and also in the releasing chamber, the air passing from the latter to the former through port 18 and pipe 19. As the pressure in both chambers is equal, the milk, which flows through nozzle 27 from the teat cups, first passes to the suction chamber and then to the releasing chamber through spout 11, and as there is a partial vacuum in the releasing chamber, valve 14 will be retained closed by atmospheric pressure. As the level of the milk rises in the releasing chamber, the float will rise. As soon as the float has risen to a sufficient height to throw the weights 23 beyond a vertical plane extending through the axis of the levers 21 and 24, the weights will move to the right and the projections 22 will engage tappet 17ª and shift the valve stem and its valve 16 from the position shown in Fig. 1 to that shown in Fig. 4. This shifting of the valve will close communication between the suction chamber and the releasing chamber through port 18 and open the releasing chamber to atmosphere through port 20. This opening of the port 20 will place both sides of valve 14 under atmospheric pressure and the weight of the milk in the releasing chamber will open valve 14, so that the milk is free to flow from the releasing chamber.

As the releasing chamber is opened to atmosphere, the suction in the suction chamber will close valve 12 and retain in the suction chamber the milk which flows from the teat cups during the draining of the releasing chamber.

As soon as the level of the milk in the releasing chamber fall sufficiently to permit the float to fall to a position to move the weights 23 beyond the vertical plane through the axis of the levers 21 and 24, said weights will shift lever 21 and valve 16 back to the position shown in Fig. 1 to close port 20 to atmosphere and open the releasing chamber to suction. This reversal of the valve 16 will cause the valve 14 to be closed by suction and atmospheric pressure; and as soon as the vacuum in the releasing chamber equals the weight or head of milk in the suction chamber and the vacuum therein, the valve 12 will be opened and the milk will again flow from the suction chamber to the releasing chamber until the valve is again shifted.

In Fig. 5 I have shown a valve 14ª which is hung from the interior of the spout 13ª to avoid the formation of projections on the exterior.

The advantages of my invention result from the provision of a milk releaser having a releasing chamber with inlet and outlet valves through which the milk passes in its flow from the milking machine proper to the pail or container in which the opening and closing of the valves are controlled by suction and atmospheric pressure and in which the pressure variations are controlled by a valve device which is interiorly controlled by the level of the milk in the releasing chamber.

Having now fully described my invention, what I claim and desire to protect by Letters Patent is:

1. A milk releaser for a milking system having a milk releasing chamber and a suction chamber adapted for connection to a milk tube and a vacuum pipe, there being a milk flow passage between the chambers and a milk outflow passage from the milk releasing chamber, pressure-actuated valves for the respective passages, means, including a movable valve, adapted to establish air communication between the milk releasing chamber and the suction chamber and atmosphere alternately, and a float in the milk releasing chamber connected to the movable valve whereby the release of the milk from the system is under the control of the rise and fall of the milk in the releasing chamber.

2. A milk releaser having a milk releasing chamber and a suction chamber adapted for connection to a milk tube and a vacuum pipe, there being a milk flow passage between the chambers and a milk outflow passage from the milk releasing chamber, pressure actuated valves for the respective passages, means, including a movable valve, adapted to establish air communication between the milk releasing chamber and the suction chamber and atmosphere alternately, a weight which, when moved from one side to the other of an intermediate position, drops by gravity to actuate said valve, and a float in the milk releasing chamber adapted, in rising or falling, to move the weight into position to allow it to operate as specified.

3. A milk releaser for the purpose described having a suction chamber and a milk releasing chamber, means for connecting said suction chamber to a milk pipe and a vacuum pipe, a flow passage leading from the suction chamber to the releasing chamber, a pressure actuated valve for opening and closing said passage, a flow passage leading from the releasing chamber, a pressure actuated valve for closing and opening said passage, a second connection between the suction chamber and the releasing chamber, a connection between the releasing chamber and the atmosphere, a valve for closing one of said last connections and opening the other, and float controlled means for actuating said last mentioned valve for connecting the releasing chamber with atmosphere when the milk in the releasing chamber rises above a predetermined level and for cutting off the connection to the suction chamber and for reversing said connections when the milk in the releasing chamber falls below a predetermined level.

4. A milk releaser for the purpose described having a suction chamber and a milk releasing chamber, means for connecting said suction chamber to a milk pipe and a vacuum pipe, a flow passage leading from the suction chamber to the releasing chamber, a pressure actuated valve for opening and closing said passage, a flow passage leading from the releasing chamber, a pressure actuated valve for closing and opening said passage, a second connection between the suction chamber and the releasing chamber, a connection between the releasing chamber and the atmosphere, a valve for closing one of said last connections and opening the other, a weighted actuating lever for actuating said valve, a second lever for actuating the first lever, and a float in the releasing chamber for actuating the second lever.

In testimony of which invention, I have hereunto set my hand, at New York, on this 19th day of November, 1921.

CYRUS HOWARD HAPGOOD.

Witnesses:
 Geo. D. Tallman,
 R. P. Warren.